(12) United States Patent
Haas et al.

(10) Patent No.: US 7,636,735 B2
(45) Date of Patent: Dec. 22, 2009

(54) METHOD FOR ESTIMATING THE COST OF QUERY PROCESSING

(75) Inventors: Peter Jay Haas, San Jose, CA (US); Vanja Josifovski, Los Gatos, CA (US); Guy Maring Lohman, San Jose, CA (US); Chun Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/206,978

(22) Filed: Aug. 19, 2005

(65) Prior Publication Data

US 2007/0043696 A1 Feb. 22, 2007

(51) Int. Cl.
*G06F 17/30* (2006.01)

(52) U.S. Cl. ............................ 707/104.1; 707/2; 707/4; 707/5

(58) Field of Classification Search ............... 707/104.1, 707/2, 100, 1, 4, 5
See application file for complete search history.

(56) References Cited

U.S. PATENT DOCUMENTS

| | | | | |
|---|---|---|---|---|
| 5,091,852 A | * | 2/1992 | Tsuchida et al. | 707/2 |
| 5,379,422 A | * | 1/1995 | Antoshenkov | 707/1 |
| 6,330,552 B1 | | 12/2001 | Farrar et al. | |
| 6,353,818 B1 | * | 3/2002 | Carino, Jr. | 707/2 |
| 6,738,755 B1 | * | 5/2004 | Freytag et al. | 707/2 |
| 6,763,359 B2 | | 7/2004 | Lohman et al. | |
| 2004/0039729 A1 | | 2/2004 | Boger et al. | |
| 2005/0091196 A1 | | 4/2005 | Day et al. | |
| 2005/0240624 A1 | * | 10/2005 | Ge et al. | 707/104.1 |
| 2006/0259460 A1 | * | 11/2006 | Zurek et al. | 707/2 |

OTHER PUBLICATIONS

Qiang Zhu, Building Regression Cost Models for Multidatabase systems, 1996, pp. 1-13.*
Pednault, "Transform Regression and the Kolmogorov Superposition Theorem" IBM Research Report; RC23227 (W0406-014) Jun. 3, 2004.
Zhu et al, "Building Regression Cost Models for Multidatabase Systems" Parallel and Distributed Information Systems, 1996; Fourth International Conference on Dec. 18-20, 1996; pp. 220-231.
Halverson et al, "Mixed Mode XML Query Processing" Proceedings of the 29th VLBD Conference; 2003.
Selinger et al, "Access Path Selection in a Relational Database Management System" ACM SIGMOD Conference 1979, pp. 23-34.

\* cited by examiner

*Primary Examiner*—John R. Cottingham
*Assistant Examiner*—Sherief Badawi
(74) *Attorney, Agent, or Firm*—IP Authority, LLC; Ramraj Soundararajan; Van Nguy

(57) ABSTRACT

Provided is a method for modeling the cost of XML as well as relational operators. As with traditional relational cost estimation, a set of system catalog statistics that summarizes the XML data is exploited; however, the novel use of a set of simple path statistics is also proposed. A new statistical learning technique called transform regression is utilized instead of detailed analytical models to predict the overall cost of an operator. Additionally, a query optimizer in a database is enabled to be self-tuning, automatically adapting to changes over time in the query workload and in the system environment.

15 Claims, 8 Drawing Sheets

Algorithm 1 XNAV Pattern Matching

XNAV(P : Parse Tree, X : XMLDocument)
```
 1  match_buf ← {root of P};
 2  while not end-of-document
 3    do x ← next event from traversal of X;
 4      if x is a startElement event for XML node y
 5          if y matches some r ∈ match_buf
 6              set r's status to TRUE;
 7              if r is a non-leaf
 8                  set r children's status to FALSE;
 9                  add r's children to match_buf;
10              if r is an output node
11                  add r to out_buf;
12              if r is a predicate tree node
13                  add r to pred_buf;
14          elseif no r ∈ match_buf is connected by //-axis
15              skip through X to y's following sibling;
16      elseif x is endElement event for XML node y
17          if y matches r ∈ match_buf
18              remove r from match_buf;
19          if y is in pred_buf
20              set y's status to the result of evaluating
                    the predicate;
21          if the status of y or one of it's children is FALSE
22              remove y from out_buf;
```

FIG. 1

Algorithm 2 Estimation Functions

Visits(proot : Parse TreeNode)

1   $v \leftarrow 0$;
2   for each non-leaf node $n$ in depth-first order
3       do $p \leftarrow$ the path from proot to $n$;
4          if $p$ is a simple path (i.e., no //-axis)
5             if one of $n$'s children is connected by //-axis
6                 $v \leftarrow v + |p\,//\,*|$;
7                 skip $n$'s descendants in the traversal;
8             else  $v \leftarrow v + |p/*|$;
9   return $v$;

Results(proot : Parse TreeNode)

1   $t \leftarrow$ the trunk in proot
2   return $|t|$;

Pages(proot : Parse TreeNode)

1   $p \leftarrow 0$; $R \leftarrow \phi$;
2   $L \leftarrow$ List of all root-to-leaf paths in depth-first order;
3   for every pair of consecutive paths $l_j, l_{j+1} \in L$
4     do add common subpath between $l_j$ and $l_{j+1}$ to $R$;
5   for each $l \in L$
6     do $p \leftarrow p + ||l||$;
7   for each $r \in R$
8     do $p \leftarrow p - ||r||$;
9   return $p$;

FIG. 5A

Algorithm 2 Estimation Functions

Buf-Inserts(p : LinearPath)

1  if $p$ is not recursive
2      return $|p|$;
3  else $m \leftarrow 0$;
4      for each recursive node $u$ such that $p = l // u$
5          do $m \leftarrow m + \Sigma_{i=1}^{d} | l \{ // u \}^{*i} |$;
6      return $m$;

Match-Buffers(proot : Parse TreeNode)

1  $m \leftarrow 0$;
2  for each non-leaf node $n$
3      do $p \leftarrow$ the path from proot to $n$;
4          $m \leftarrow m +$ Buf-Inserts($p$) X FANOUT($n$);
5  return $m$;

Pred-Buffers(proot : Parse TreeNode)

1  $r \leftarrow 0$;
2  for each predicate-tree node $n$
3      do $p \leftarrow$ the path from proot to $n$;
4          $r \leftarrow r +$ Buf-Inserts($p$);
5  return $r$;

Out-Buffers(proot : Parse TreeNode)

1  $t \leftarrow$ the trunk in proot
2  return Buf-Inserts($t$);

Post-Process(proot : Parse TreeNode)

1  $L \leftarrow$ all possible paths in the parse tree rooted at proot;
2  $n \leftarrow 0$;
3  for each $l \in L$
4      do $n \leftarrow n +$ Buf-Inserts($l$);
5  return $n$;

FIG. 5B

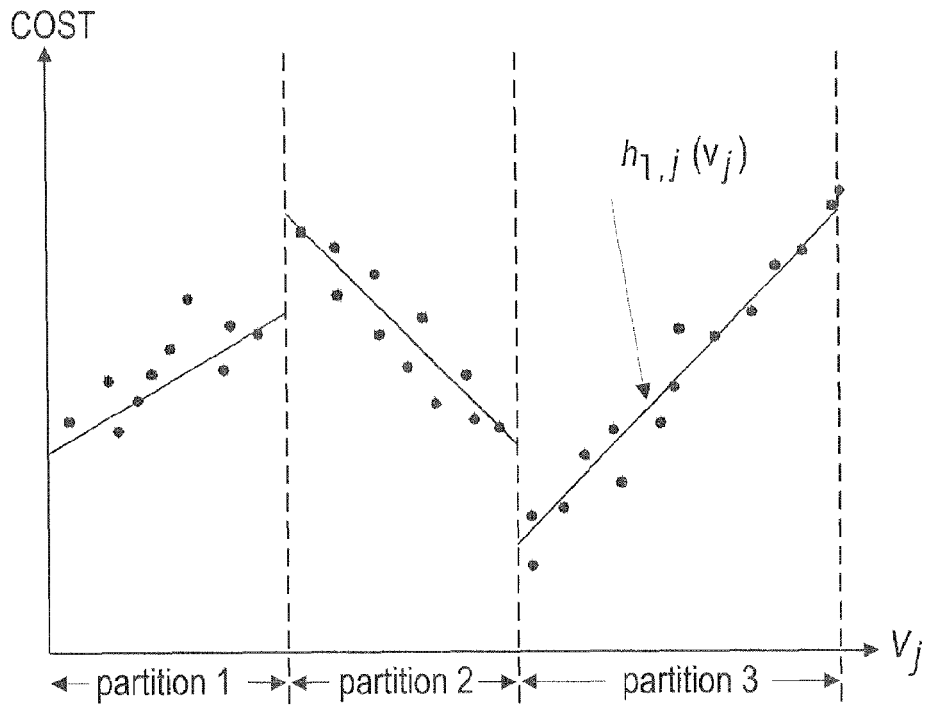
(a) Cost vs $v_j$
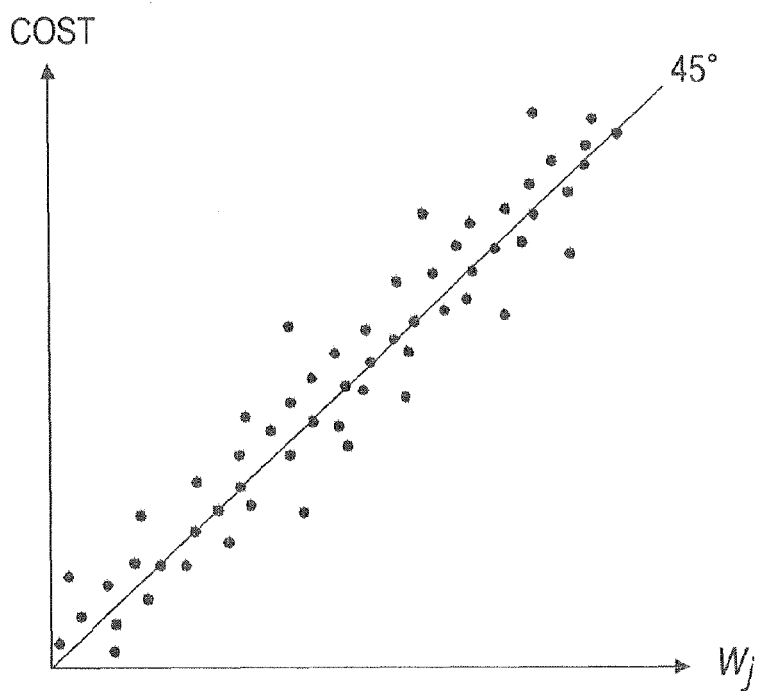
(b) Cost vs $w_j$
FIG. 6

METHOD FOR ESTIMATING THE COST OF QUERY PROCESSING

RELATED APPLICATIONS

This application is related to the application entitled "Method and Structure for Transform Regression", which has been assigned U.S. Ser. No. 10/727,578, which is hereby incorporated by reference in its entirety, including any appendices and references thereto.

BACKGROUND OF THE INVENTION

1. Field of Invention

The present invention relates generally to the field of database query optimization. More specifically, the present invention is related to a hybrid analytical and statistical learning approach to query operator cost estimation.

2. Discussion of Prior Art

Developing cost models for query optimization is significantly harder for XML queries than for traditional relational queries. This is because XML query operators are much more complex than relational operators such as table scans and joins. Management of XML data, especially the processing of XPath queries, has been the focus of considerable research and development activity over the past few years. A wide variety of join-based, navigational, and hybrid XPath processing techniques are now available. Each of these techniques can exploit indices that are either structural, value-based, or both. An XML query optimizer can therefore choose among a large number of alternative plans for processing a specified XPath expression. As in the traditional relational database setting, the optimizer needs accurate cost estimates for the XML operators in order to choose a good plan.

Unfortunately, developing cost models of XML query processing is much harder than developing cost models of relational query processing. Relational query plans can be decomposed into a sequence of relatively simple atomic operations such as table scans, nested-loop joins, and so forth. The data access patterns for these relational operators can often be predicted and modeled in a fairly straightforward way. Complex XML query operators such as TurboXPath and holistic twig join, on the other hand, do not lend themselves to such a decomposition. The data access patterns tend to be markedly non-sequential and therefore quite difficult to model. For these reasons, the traditional approach of developing detailed analytic cost models based on a painstaking analysis of the source code often proves extremely difficult. Such an analysis is also particularly difficult for an XML query, more so than for a relational query. Cost estimation is similarly difficult for queries with user-defined functions (UDFs) and in multiple databases systems. In this latter setting, some researchers have proposed replacing analytic cost models with statistical learning models that estimate the cost of processing a query based on the input features of the query and data. Input features are chosen on the basis of those features that appear most likely to affect the cost of processing a query.

In the setting of user-defined functions (UDFs), features are often fairly obvious; for example, the values of the arguments to the UDF, or perhaps some simple transformations of these values. In the multiple database setting, determining features becomes more complicated. In the XML setting, feature identification becomes even more complex. The features that have the greatest impact on the cost of executing a query or query operator tend to be "posterior" features; for example, the number of data objects returned and the number of candidate results inserted in an in-memory buffer. These depend on the data and cannot be observed until after the operator has finished executing. Thus, there is a need in the art for estimating values for posterior input features to a query operator.

The motivation for the XML query optimization problem is first discussed and subsequently, an overview of one typical XML query operator, called XNav, is given. Consider the following FLWOR expression, which finds the titles of all books having at least one author named "Stevens" and published after 1991.

```
<bib>
{
    for $b in doc("bib.xml")/bib/book
    where $b/authors//last = "Stevens" and
        $b/@year > 1991
    return
        <book>
            { $b/title }
        </book>
}
</bib>
```

The three path expressions in the for- and where- clauses constitute the matching part, and the return clause corresponds to the construction part. In order to answer the matching part, an XML query processing engine may generate at least three query plans: navigate the bib.xml document down to find all book elements under the root element bib and, for each such book element, evaluate the two predicates by navigating down to the attribute year and element last under authors; find the elements with the values "Stevens" or "1991" through value-based indexes, then navigate up to find the parent/ancestor element book, verify other structural relationships, and finally check the remaining predicate; or find, using a twig index, all tree structures in which last is a descendant of authors, book is a child of bib, and @year is an attribute of book and then for each book, check the two value predicates.

Any one of these plans can be the best plan, depending on the circumstances. To compute the cost of a plan, the optimizer estimates the cost of each operator in the plan—in this example, the index access operator, the navigation operator, and the join operator and then combines their costs using an appropriate formula. For example, let p1, p2, and p3 denote the path expressions doc("bib.xml")/bib/book, authors//last [.="Stevens"], and @year[.>1991], respectively. The cost of the first plan above may be modeled by the following formula:

$$cost_{nv}(p1)+|p1|\times cost_{nv}(p2)+|p1[p2]|\times cost_{nv}(p3),$$

where $cost_{nv}(p)$ denotes the estimated cost of evaluating the path expression p by the navigational approach, and |p| denotes the cardinality of path expression p. Therefore, it is shown that costing of path-expression evaluation is crucial to the costing of alternative query plans, and thus to choosing the best plan.

One navigational XML operator that has been proposed to illustrate the methodology of the present invention is the XNav operator, which is a slight adaptation of the stream-based TurboXPath algorithm as applied to pre-parsed XML stored as paged trees. It is emphasized, however, that the general methodology of the present invention is applicable to both XML and relational query operators. As with TurboXPath, the XNav algorithm processes the path query using a single-pass, pre-order traversal of the document tree. Unlike TurboXPath, which copies the content of the stream, XNav manipulates XML tree references, and returns references to all tree nodes that satisfy a specified input XPath expression. Another difference between TurboXPath and XNav is that, when traversing the XML document tree, XNav skips those portions of the document that are not relevant to the query evaluation. This behavior makes the cost modeling of XNav highly challenging. XNav behaves in a manner as approximated by the algorithm shown in FIG. 1.

Given a parse tree representation of a path expression and an XML document, XNav matches the incoming XML elements with the parse tree while traversing the XML data in document order. An XML element matches a parse-tree node if (1) the element name matches the node label, (2) the element value satisfies the value constraints if the node is also a predicate tree node, and (3) the element satisfies structural relationships with other previously matched XML elements as specified by the parse tree. An example of the parse tree is shown in FIG. 2. It represents the path expression /bib/book [authors//last="Stevens"][@year>1991]/title. In this parse tree, each unshaded node corresponds to a "NodeTest" in the path expression, except that the node labeled "r" is a special node representing the starting node for the evaluation, which can be the document root or any other internal node of the document tree. The doubly-circled node is the "output node". Each NodeTest with a value constraint (i.e., a predicate) has an associated predicate tree. These are shaded in FIG. 2. Edges between parse tree nodes represent structural relationships (i.e., axes). Solid and dashed lines represent child ("/") and descendant ("//") axes, respectively. Each predicate is attached to an "anchor node" (book in the example) that represents the XPath step at which the predicate appears.

For brevity and simplicity, only path those expressions containing / and //-axes, wildcards, branching, and value-predicates are considered.

SUMMARY OF THE INVENTION

The method of the present invention, Cost Modeling Evolution by Training, (hereinafter, "Comet"), provides for a hybrid approach to developing a cost model for a complex query operator. In one embodiment, a CPU cost model for the XNav operator, an adaptation of TurboXPath, is shown. However, Comet is applicable to complex operators and queries that are both XML and relational. In another embodiment, the Comet methodology combines statistical learning methods to develop cost models of complex user-defined functions (UDFs) and remote autonomous database systems in a multi-database setting.

A set of query and data features that are relevant to determining operator cost is first identified. Using training data, Comet then automatically learns functional relationships between identified feature values and operator cost. A resulting cost function is then applied at optimization time to estimate the cost of an operator for incoming production queries. Since feature values are usually unknown a priori, Comet first estimates the values of posterior features using a set of database catalog statistics that summarize data characteristics. In one embodiment, a novel set of "simple path" (SP) statistics that are well suited to cost modeling for complex navigational XML operators, along with corresponding feature estimation procedures for XNav, are also shown.

Another facet of Comet's statistical learning methodology is that an XML query optimizer, through a process of query feedback, is able to exploit Comet in order to be self-tuning. That is, the method of present invention automatically adapts to changes over time in the query workload and in the system environment. To provide for such adaptation, user queries are provided to a query optimizer, each of which generates a query plan. During plan execution, a runtime engine executes an operator of interest and a runtime monitor records feature values and subsequent execution costs. Comet then uses feedback data to update a cost model. In one embodiment, a cost model for a query operator is initially built using the feedback loop described above, but with training queries instead of user queries. The training phase ends once a satisfactory initial cost model is generated, where standard techniques such as n-fold cross-validation are used to assess model quality.

BRIEF DESCRIPTION OF THE DRAWINGS

FIG. 1 is an exemplary XNav pattern-matching algorithm.

FIGS. 5A-5B illustrate an algorithm comprising functions estimating feature values.

FIG. 6 illustrates feature linearization in cost versus input feature graphs.

DESCRIPTION OF THE PREFERRED EMBODIMENTS

Figure 2:
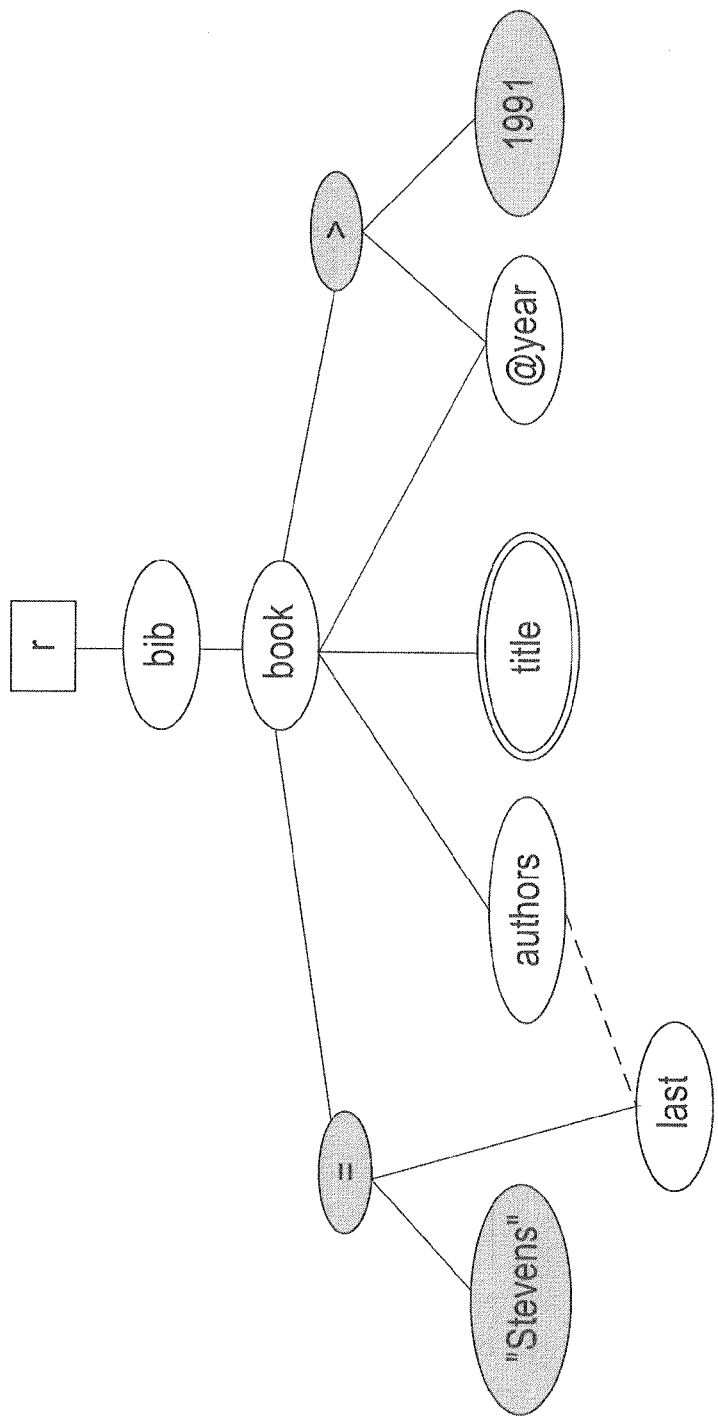
FIG. 2 is an exemplary XML parse tree.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 3A:
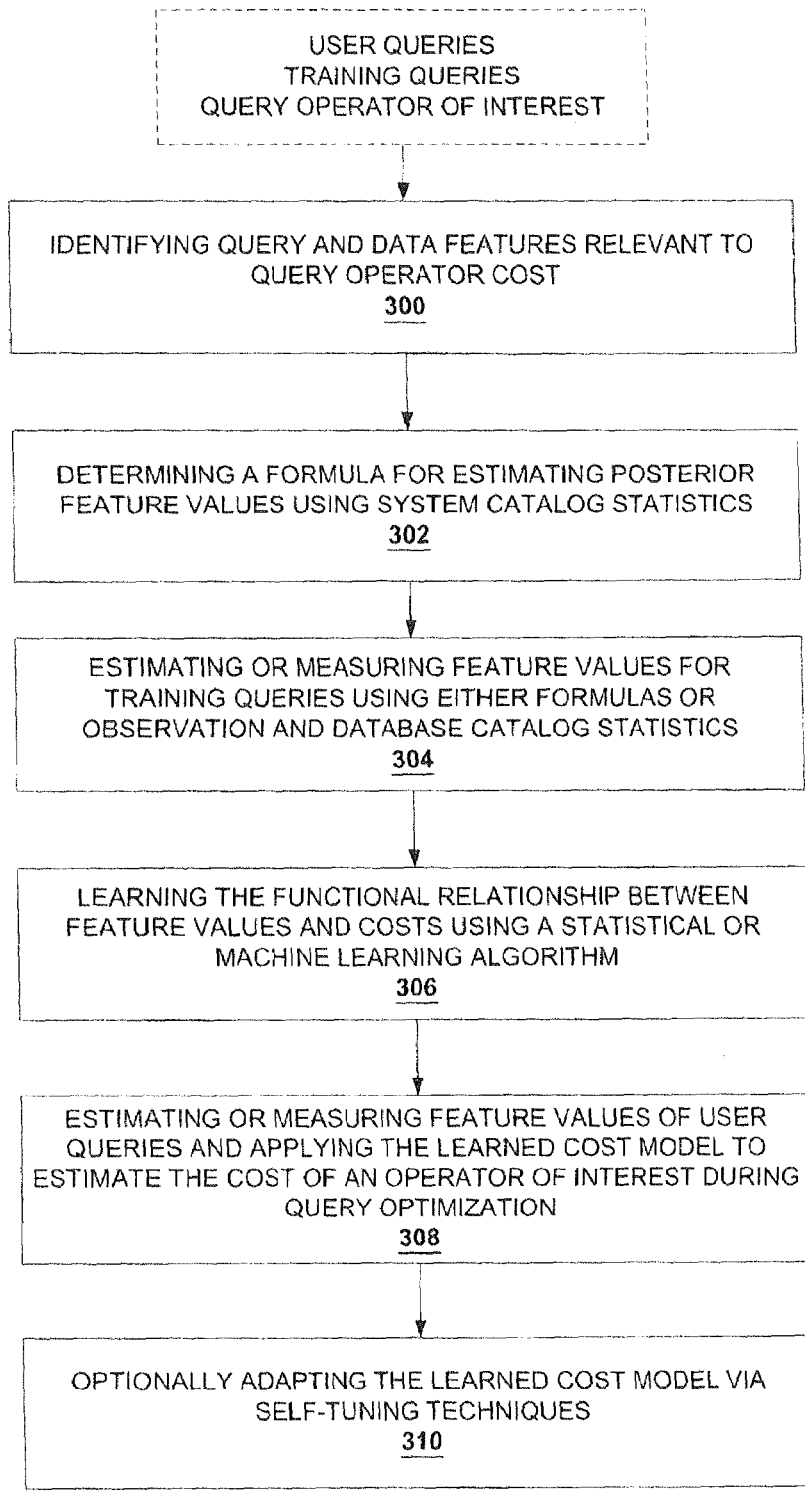
FIG. 3a illustrates a process flow diagram for the method of the present invention.
Figure 3B:
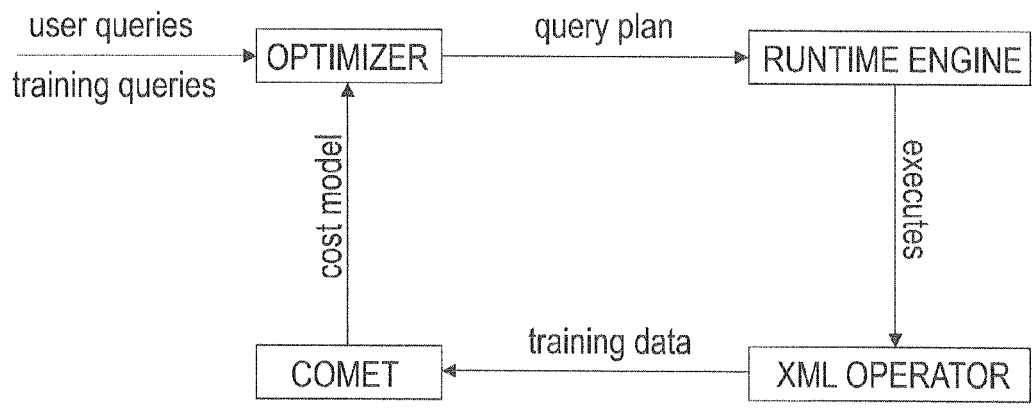
FIG. 3b illustrates the use of Comet in self-tuning systems.

Referring now to FIG. 3a, the method of the present invention is shown as comprising the following basic steps: identifying query and data features that are relevant determinants of query operator of interest cost 300; determining a formula for estimating posterior feature values using database catalog statistics 302; estimating or measuring feature values for training queries using either the formulas determined in step 302, or observation techniques along with database catalog statistics 304; learning the functional relationship between feature values and costs of executed training queries using either a statistical or machine learning algorithm 306; applying the learned cost model to estimate a cost for the operator of interest in a one or more user queries during query optimization by estimating or measure feature values of user queries 308; and optionally adapting the learned cost model via self-tuning procedures 310. The present invention is also described by a system comprised of: a feature identifier that determines at least one input feature to a plurality of training queries for which values are either known or unknown; a value estimator estimating values for the input features based on system catalog statistics comprising simple path (SP) statistics, if values are unknown; a runtime engine executing the plurality of training queries containing a query operator of interest and the input features; a statistical model fitter determining whether cost of executing said query operator changes as values of said at least one input feature are varied and if so, statistically fitting a model to correlate observed costs of executing said query operator with the input features; and a cost estimator, based on said model and input features, estimating the cost for executing the query operator of interest in a user query. Shown in FIG. 3b is an example of how Comet is incorporated into a database system.

Feature Identification

Features pertinent to an operator of interest, in the exemplary case, the XNav operator, are determined by analyzing the algorithm, through experience, and by experimentation. Input features are identified either manually or automatically; if an automatic approach is used, in one embodiment, profiling techniques are used to facilitate feature identification. Referring back to FIG. 1, as can be seen from Algorithm 1, XNav employs three kinds of buffers: output buffers, predicate buffers, and matching buffers. The more elements inserted into the buffers, the more work is performed by the algorithm, and thus the higher the cost associated with the operator of interest. Therefore, the following are chosen as three query features, the total number of elements inserted into the output, predicate, and matching buffers, respectively, during query execution. Corresponding feature variables are denoted as #out_bufs, #preds_bufs, and #match_bufs. In addition to the number of buffer insertions, XNav's CPU cost is also influenced by the total number of nodes that are visited by the algorithm in the XML document. Therefore, also included as a feature is a number of visits, denoted as #visits. Another important feature is #results, the number of XML elements returned by XNav. This feature affects CPU cost in a number of ways. For example, a cost is incurred whenever an entry in the output buffer is removed due to invalid predicates, as shown in line 22 of algorithm 1; the number of removed entries is roughly equal to #out_bufs−#results.

Whenever XNav generates a page request, a CPU cost is incurred as a page cache is searched. An I/O cost may also be incurred if the page is not in the page cache. Thus also included in the set of features, is the number of page requests denoted as #p_requests. Note that #p_requests cannot be subsumed by #visits, because different data layouts may result in different page-access patterns even when the number of visited nodes is held constant. A final key component of the CPU cost is the post-processing cost incurred as shown in lines 17 to 22 of algorithm 1. This cost can be captured by a feature variable #post_process, defined as the total number of endElement events that trigger execution of one or more events as shown in lines 18, 20, and 22 of algorithm 1.

Each of the features identified thus far is a posterior feature in that the feature value is determined after the operator is executed. However, it is necessary for Comet to estimate these features at the time of query plan optimization, prior to operator execution. To this end, Comet computes estimates of the posterior feature values using a set of catalog statistics that summarize important data characteristics. Subsequently discussed are novel SP statistics that Comet uses and procedures for estimating values for identified features.

In order to describe SP statistics, the following terminology is introduced. An XML document can be represented as a tree T, where nodes correspond to elements and arcs correspond to child relationships a single step away. Given any path expression p and an XML tree T, the cardinality of p under T, denoted as |p(T)|, or simply |p| when T is clear from the context, is the number of result nodes that are returned when p is evaluated with respect to the XML document represented by T. A simple path expression is a linear chain of NodeTests that are connected by child axes. For example, /bib/book/@year is a simple path expression, whereas //book/title and /*/book[@year]/publisher are not. A simple path p in T is a simple path expression such that |p(T)|>0. Denoted by P(T) is the set of all simple paths in T. For each simple path p∈P(T), Comet maintains the following statistics:

the cardinality of p under T, |p|;
the number of p's children under T, |p/*|;
the number of p's descendants under T, |p//*|;
the number of pages requested in order to answer the path query p, denoted as ‖p‖; and
the number of pages requested in order to answer the path query p//*, denoted as ‖p//*‖.

Denoted by $s_p = <s_p(1), \ldots, s_p(5)>$ are the forgoing statistics, enumerated in the order given above. SP statistics for an XML document represented by a tree T are then defined as $S(T)=\{(p, s_p): p \in P(T)\}$.

Figure 4:
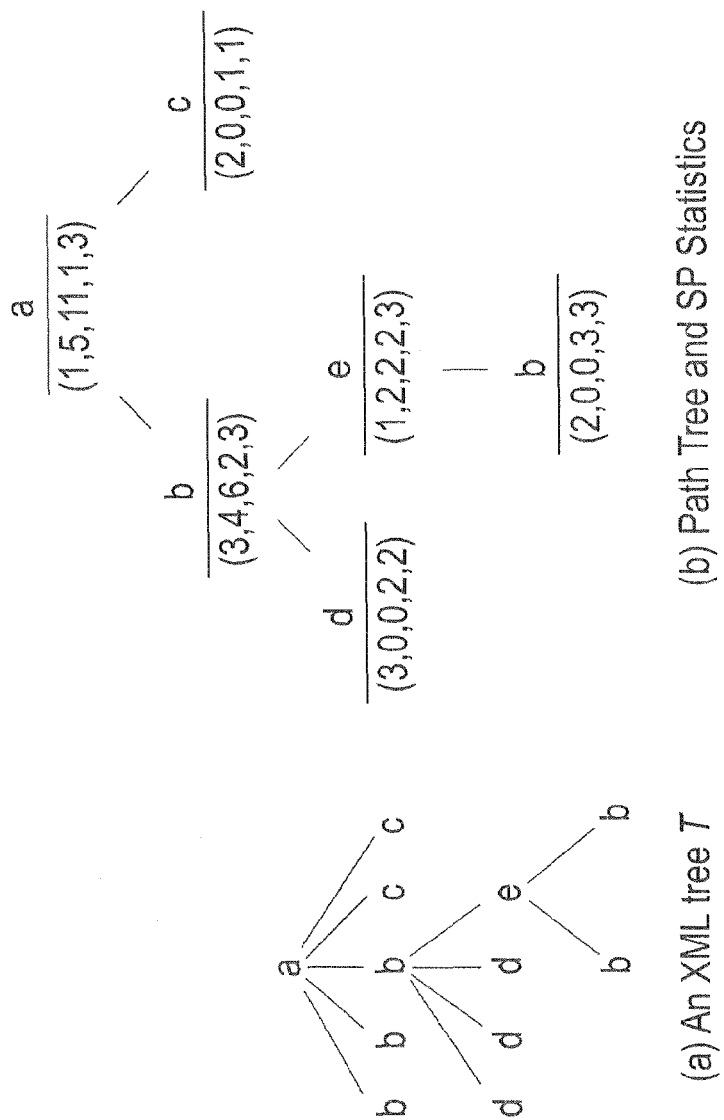
FIG. 4 illustrates an XML tree, its path tree, and SP statistics.

In one embodiment, SP statistics are stored in a path tree, which captures all possible simple paths in the XML tree. For example, FIG. 4 shows an XML tree and the corresponding path tree with SP statistics. Note that there is a one-to-one relationship between the nodes in the path tree Tp and the simple paths in the XML tree T. Alternatively, SP statistics can be stored in a more sophisticated data structure such as TreeSketch or simply in a table.

Shown in FIGS. 5A-5B, is algorithm 2, which lists functions that estimate feature values from SP statistics. These estimation functions allow path expressions to include an arbitrary number of //-axes, wildcards ("*"), branches, and value predicates. The parameter proot of the functions is the special root node in the parse tree, labeled as "r" in FIG. 2. The function "Visits" in algorithm 2 of FIGS. 5A-5B is straightforward. At each step of a path expression, if the current NodeTest u is followed by /, then a traversal of the children of u ensues. If u is followed by //, then a traversal of the subtree rooted at u ensues. For example, for the parse tree shown in FIG. 2, visits=1+|/*|+|/bib/*51 +|/bib/book/*|+|/bib/book/authors//*|, where the first term in the sum corresponds to the document root, matched with the node, r in the parse tree. The cardinality of a tree "trunk" estimates #results; in other words, the simple path obtained from the original path expression by removing all branches. For the parse tree shown in FIG. 2, the estimate is simply results≈|bib/book/title|.

The function Pages computes the number of pages requested when evaluating a particular path expression. The following buffering assumption is made; when navigating the XML tree in a depth-first traversal, a page read when visiting node x is kept in the buffer pool until all x's descendants are visited. Under this assumption, it is observed that:

‖/a[b][c]‖=‖/a‖=‖/a/c‖=‖/a/*‖; and

‖/a[b/c][d/e]‖≈‖/a/b/c‖+‖/a/d/e‖−‖/a/*‖.

The observation is generalized to path expressions with more than two branches in function "Pages" of Algorithm 2 shown in FIGS. 5A-5B. For the parse tree in FIG. 2, the feature estimate is:

p requests ≈ ‖/bib/book/authors//*‖ +

-continued $$\|/bib/book/title\| + \|/bib/book/@year\| -$$

$$\|/bib/book/*\| - \|/bib/book/*\|$$

$$= \|/bib/book/authors//*\|.$$

Buffer insertions occur whenever an incoming XML event matches one or more nodes in the matching buffer, as shown in line 5 of Algorithm 1 shown in FIG. 1. An XML event can create two or more matching buffer entries for a single parse tree node when two parse-tree nodes connected by one or more //-axes have the same name. In this case, the number of buffer insertions induced by a recursive parse tree node u can be estimated as follows: first, all nodes returned by l//u are inserted into the buffer, where l is the prefix of the path from root to u. Next, all nodes returned by l//u//u are inserted, then all nodes returned by l//u//u//u, and so forth, until a path expression returns no results. The total number of nodes inserted can therefore be computed as $$\sum_{i=d}^{\infty} |l\{//u\}^{*i}|,$$

where d is the depth of the XML tree and $\{//u\}^{*i}$ denotes the i-fold concatenation of the string "//u" with itself. The function Buf-Inserts in Algorithm 2 calculates the number of buffer insertions for a specified linear path expression that may or may not contain recursive nodes. If the path has no recursive nodes, the function simply returns the cardinality of the path. Otherwise, the function returns the sum of number of insertions for each recursive node. Buf-Inserts is called by each of the last four functions in Algorithm 2.

The feature #match_bufs is the total number of entries inserted into the matching buffer, which stores those candidate parse tree nodes that are expected to match with the incoming XML nodes. In Algorithm 1, whenever an incoming XML event matches with a parse tree node u, a matching-buffer entry is created for every child of u in the parse tree. Therefore, #match_bufs is estimated by summing fanout(u) over every non-leaf parse-tree node u, where fanout(u) denotes the number of u's children. For the parse tree in FIG. 2, there are no recursive nodes, so that #match_bufs is estimated as:

match_bufs≈|/bib|+3×|/bib/book|+|/bib/book/authors|+|/bib/book/authors//last|, where the factor 3 is the fanout of node book in the parse tree.

The derivation of the function Out-Buffers is similar to that of "Results", and the derivation of Pred-Buffers is straightforward; therefore, both are omitted for the sake of brevity. According to Algorithm 1, post-processing is potentially triggered by each endElement event, as shown in line 16. If the closing XML node was not matched with any parse tree node, no actual processing is needed; otherwise, the buffers need to be maintained, as shown in lines 17 to 22. Thus, the feature #post_process is estimated by the total number of XML tree nodes that are matched with parse tree nodes. For the parse tree shown in FIG. 2, #post_process is estimated as post_process≈1+|/bib|+|/bib/book|+|/bib/book/authors|+|/bib/book/authors//last|+|/bib/book/title|+|/bib/book/@year|, where the first term results from the matching of the root node.

Given a set of d features, Comet uses a statistical learner to determine a function $f$ such that, to a good approximation, $$\text{cost}(q) = f(v_1, v_2, \ldots, v_d) \quad (1)$$

for each query q where $v_1, v_2, \ldots, v_d$ are the d feature values associated with query q. Comet uses a supervised learning approach; training data consists of n≧0 points $x_1, \ldots, x_n$ with $x_i = (v_{1,i}, v_{2,i}, \ldots, v_{d,i}, c_i)$ for $1 \leq i \leq n$. Here $v_{j,i}$ is the value of the jth feature for the ith training query $q_i$ and $c_i$ is the observed cost for $q_i$. As previously discussed, the learner is initialized using a starting set of training queries, which can be obtained from historical workloads or synthetically generated. Over time, the learner is periodically retrained using queries from the actual workload.

For each "posterior" feature, Comet actually uses estimates of the feature value—computed from catalog statistics—when building the cost model. That is, the ith training point is of the form $\hat{x}_i = (\hat{v}_{1,i}, \hat{v}_{2,i} \ldots \hat{v}_{d,i}, c_i x_i)$ where $\hat{v}_{j,i}$ is an estimate of $v_{j,i}$. An alternative approach uses the actual feature values for training the model. In this manner, Comet compensates for systematic biases in feature estimates.

Statistical Learning

In a preferred embodiment, uses transform regression to statistically fit a cost model to the relationship observed between input feature values and query costs. For details of transform regression, please refer to the patent application publication incorporated herein by reference, "Method and Structure for Transform Regression." In another embodiment, a neural network approach is used. In yet another embodiment, a nearest neighbor method is applied.

Updating the Model

Comet exploits a number of existing techniques for maintaining statistical models. Key issues for model maintenance include: when to update the model, how to select appropriate training data, and how to efficiently incorporate new training data into an existing model. One very aggressive policy updates the model whenever the system executes a query. Such an approach is likely to incur an unacceptable processing-time overhead. A more reasonable approach updates the model either at periodic intervals or when cost-estimation errors exceed a specified threshold.

There are many ways to choose the training set for updating a model. An approach that is more responsive to changes in the system environment uses all of the queries that have arrived during a recent time window, or a sample of such queries. It is also possible to maintain a sample of queries that contains some older queries, but is biased towards more recent queries. Updating a statistical model involves either re-computing the model from scratch, using the current set of training data, or using an incremental updating method. Experiments indicate that even re-computing a TR model from scratch is an extremely rapid and efficient operation; experiments also indicate that a TR model can be constructed from several thousand training points in a fraction of a second.

Additionally, the present invention provides for an article of manufacture comprising computer readable program code contained within implementing one or more modules to build an adaptive cost model, through a hybrid analytical and statistical learning approach, that estimates the cost of an operator of interest. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) identifying relevant input features potentially affecting the cost of executing an operator of interest within a user query; (b) estimating feature values for an operator of interest using system catalog statistics; and (c) determining a cost model to estimate the cost of the operator of interest.

CONCLUSION

A system and method has been shown in the above embodiments for the effective implementation of a method for estimating the cost of processing an XML query. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A computer-based method of determining a cost model, said cost model modeling the cost of executing a query operator, said query operator in a user query to be executed against a database, said method comprising:
   a. determining at least one input feature of a plurality of training queries, said at least one input feature, for which values are either known or unknown, which is assumed to be relevant to said cost model, said input features automatically determined using profiling techniques and said at least one input feature either derived or observed from statistics obtained by traversing a tree representation of data stored in said database;
   b. estimating values for said at least one input feature based on statistics Sp stored by said database, and
   when values for said at least one input feature are unknown:
   said Sp is a function of a cardinality of a path query p under said tree T, number of p's children under T; number of p's descendants under T; and number of pages requested in order to answer said path query p, and said statistics Sp stored by said database are simple path statistics comprising the cardinality of a simple path under an XML tree, the number of simple path children under an XML tree, the number of simple path descendants under an XML tree, and the number of pages requested in order to answer a simple path query, said simple path expressions defining a linear chain of node tests that are connected by child axes;
   c. executing said plurality of training queries containing said query operator and said at least one input feature and determining whether cost of executing said query operator changes as values of said at least one input feature are varied and if so, statistically fitting a model to correlate observed costs of executing said query operator with said at least one input feature; and
   d. estimating, based on said model and said at least one input feature, a cost for executing said query operator in said user query.

2. The computer-based method of claim 1, wherein said query is any of: an XML or XPATH query and wherein said database stores XML data.

3. The computer-based method of claim 1, wherein a subset of said input features are posterior features.

4. The computer-based method of claim 1, wherein said input features are determined on the basis of affecting the cost of executing said query operator.

5. The computer-based method of claim 1, wherein said model is fitted by any of: regression, neural network, or nearest neighbor approaches.

6. The computer-based method of claim 5, wherein said regression is any of: a linear, nonlinear, transform, or piecewise linear regression.

7. The computer-based method of claim 1, wherein said method further comprises iteratively repeating step a through step d to increase the accuracy of said model.

8. The computer-based method of claim 1, wherein said method is implemented by remote autonomous database systems in a multi-database setting.

9. An article of manufacture comprising a computer usable medium having computer readable program code embodied therein which implements the determination of a cost model, said cost model modeling the cost of executing a query operator, said query operator in a user query to be executed against a database, said medium comprising modules implementing:
   a. determining at least one input feature of a plurality of training queries, said at least one input feature, for which values are either known or unknown, which is assumed to be relevant to said cost model, said input features automatically determined using profiling techniques and said at least one input feature either derived or observed from statistics obtained by traversing a tree representation of data stored in said database;
   b. estimating values for said at least one input feature based on statistics Sp stored by said database, and
   when values for said at least one input feature are unknown:
   said Sp is a function of a cardinality of a path query p under a tree T, number of p's children under T; number of p's descendants under T; and number of pages requested in order to answer said path query p, said statistics Sp stored by said database are simple path statistics comprising the cardinality of a simple path under an XML tree, the number of simple path children under an XML tree, the number of simple path descendants under an XML tree, and the number of pages requested in order to answer a simple path query, said simple path expressions defining a linear chain of node tests that are connected by child axes;
   c. executing said plurality of training queries containing said query operator and said at least one input feature and determining whether cost of executing said query operator changes as values of said at least one input feature are varied and if so, statistically fitting a model to correlate observed costs of executing said query operator with said at least one input feature; and d. estimating, based on said model and said at least one input feature, a cost for executing said query operator in said user query.

10. The article of manufacture of claim 9, wherein said method further comprises iteratively repeating step a through step d to increase the accuracy of said model.

11. The article of manufacture of claim 9, wherein said query is any of: an XML or XPATH query and wherein said database stores XML data.

12. The article of manufacture of claim 9, wherein a subset of said input features are posterior features.

13. The article of manufacture of claim 9, wherein said input features are determined on the basis of affecting the cost of executing said query operator.

14. The article of manufacture of claim 9, wherein said model is fitted by any of: regression, neural network, or nearest neighbor approaches.

15. The article of manufacture of claim 14, wherein said regression is any of: a linear, nonlinear, transform, or piecewise linear regression.

* * * * *

UNITED STATES PATENT AND TRADEMARK OFFICE
CERTIFICATE OF CORRECTION

PATENT NO. : 7,636,735 B2
APPLICATION NO. : 11/206978
DATED : December 22, 2009
INVENTOR(S) : Haas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this

Ninth Day of November, 2010

David J. Kappos
*Director of the United States Patent and Trademark Office*